Patented Sept. 26, 1933

1,928,492

UNITED STATES PATENT OFFICE 1,928,492

SYNTHETIC RESIN

Arthur M. Howald, Pittsburgh, Pa., assignor to Toledo Synthetic Products, Inc., Toledo, Ohio, a corporation of Ohio No Drawing. Application July 7, 1930
Serial No. 466,044

17 Claims. (Cl. 260—3)

This invention relates to improvements in synthetic resins; and it comprises a molding powder and a process of producing the same whereby an aldehyde is condensed with ammonium cyanate in the presence of water, the excess water is removed and the condensation product dried and powdered, being advantageously mixed at this time with formaldehyde fixing agents such as urea, thiourea or resorcinol together with fillers, plasticizers or other adjuncts; and it also comprises a product formed by molding the said powder under heat and pressure; all as more fully hereinafter set forth and as claimed.

Various processes have been described previously for forming glass like synthetic resins from urea and other nitrogen derivatives, these compounds being condensed with formaldehyde in aqueous solution. Reaction is rapid. The primary condensation product thus formed has usually been concentrated by evaporation and finally hardened by heating in a mold. In certain prior and copending applications (Ser. Nos. 280,949; 339,225 and 363,412) I have described improved methods of producing such resins, making them commercially feasible for the first time.

I have now found that high grade synthetic resins can be made by employing ammonium cyanate in place of the usual urea. This salt can be condensed with such aldehydes as formaldehyde or acetaldehyde in aqueous solution. This condensation is advantageously carried out by adding the salt to a commercial 30 to 40 per cent solution of formaldehyde. The molecular proportion of formaldehyde to cyanate employed is about 2:1. Before adding the entire quantity of salt it is desirable to heat the solution nearly to the boiling point under a reflux condenser, when an exothermic reaction begins which may release sufficient heat to maintain the temperature. The remaining salt can then be added gradually or at a rate sufficient to keep the solution boiling.

In this preliminary or initial condensation, which generally requires a period of heating from 30 to 60 minutes, it is desirable to maintain a slight excess of formaldehyde above the 2 to 1 ratio, although in the later steps of the process this ratio can be reduced. It is also desirable to maintain the solution neutral or slightly alkaline—that is at a pH above 7. Acid appears to have an accelerating effect on the formation of the final insoluble product and I have found it advantageous to keep the solution free from any considerable concentration of acid until the final molding stage.

After the initial condensation stage, the water in the solution can be eliminated by any one of several methods. The solution may be merely evaporated to dryness, it may be sprayed or drum dried or it may be concentrated to a syrupy consistency, alcohol, or some other volatile liquid may then be added and the mixture expanded while hot into a vacuum chamber.

If the soluton is evaporated in such a manner that it passes through a viscous state, there may be intermixed at this point fillers, fixing agents, plasticizers, etc. Mixing may be accomplished with the use of a pugging mill after which the mixture is dried and powdered. When an appreciable amount of an absorbent filler is used, such as paper pulp, wood flour, or asbestos, the liquid condensation product may be mixed with the filler before drying, the mixture being more easily dried than the condensation product alone.

If a clear glass-like product is desired, no filler being used, the use of a plasticizer is advantageous to reduce brittleness of the final product. Any of the usual plasticizers may be used, such as phenol-aldehyde resins, meta-toluene-sulfonamid resins, etc., but it is my belief that the addition of the unsaturated resins formed by condensing polybasic acids with polyhydric alcohols, such as glycerin-phthalic acid resins, is the most desirable. With these resins there may be incorporated acids, either the same acid used in forming the resin or other acids such as tartaric or salicylic. The acid is advantageously soluble in the molten resin and solid at lower temperatures. When added in this condition the acid becomes liberated only during the final heating in the molding stage. The proportion of resin used varies with the properties desired in the final product. The plasticizer may even amount to as much as 75 per cent of the total weight of the product. The amount of acid incorporated in the plasticizer should be such as to produce a distinctly acid reaction during the molding step.

When the solution of the initial condensation process is spray dried to produce a granular product, fillers, plasticizers, fixing agents, etc., may be mixed therewith after the drying and before or after grinding. When drum drying is used it is convenient to carry out the mixing operation during the drying process. The mixture of the initial condensation product with the fillers, fixing agents, plasticizers, etc., however added, forms the molding powder of my invention.

By fixing agents, I mean those substances capable of combining with formaldehyde, the final combination taking place in the latter stages of my process. These comprise urea, thiourea, resorcinol, etc. I have found that, without the addition of these agents, a product inferior in resistance to light and heat is obtained. Urea is advantageously employed as a fixer when a filler is used. Its action is more rapid than that of thiourea and resorcinol. I can use resorcinol when a slight color in the product is unobjectionable and thiourea when a water-white product is desired. The amount of fixing agent employed is such that the final molecular ratio of the formaldehyde to the sum of the ammonium cyanate and fixing agent used in the process, varies approximately from 1.5:1 to 1.75:1.

I have also found that instead of ammonium cyanate, I can employ mixtures of salts in my process which will produce this compound in solution by metathesis. Thus if barium cyanate (1 mole) and ammonium sulfate (1 mole) are caused to react in aqueous solution with formaldehyde (3 to 4 moles), barium sulfate is formed as a precipitate and may be left in the solution to act as a filler in the final product or filtered off. The initial condensation product formed is then treated by the same steps outlined previously. Other salt combinations which form an insoluble precipitate and ammonium cyanate in solution are applicable.

The final step in my process is molding. This is done under heat and pressure. The molding powder described above is placed in the mold which is heated to the neighborhood of 140° C., and a pressure of approximately 2000 pounds per square inch is applied. The product cures rapidly in the mold and it may be removed in from 2 to 20 minutes. Although not usually required, a subsequent curing may be employed. In this case the final products may be maintained at a temperature of about 100° C. for as long as 48 hours.

As is well known, urea and ammonium cyanate, in some solutions, are tautomeric; the one passing into the other with a velocity differing with the nature of the solvent medium. Action goes to an equilibrium, different with different solvents. It may be that in the present reaction there is a production of urea at the expense of ammonium cyanate and that this urea reacts with the formaldehyde. In this event, there would be a progressive presentation of urea to the mass of formaldehyde present. This, however, is a matter of theory; and applicant contents himself with noting the fact that using formaldehyde and ammonium cyanate, or pairs of salts producing ammonium cyanate, he can produce new and useful plastics.

What I claim is:

1. In the manufacture of synthetic resins, the process which comprises forming an initial condensation product in aqueous solution from an aldehyde and ammonium cyanate the said condensation being effected in the presence of ammonium cyanate as such, drying the product and molding under heat and pressure.

2. In the manufacture of synthetic resins, the process which comprises forming an initial condensation product in aqueous solution from an aldehyde and ammonium cyanate the said condensation being effected in the presence of ammonium cyanate as such, drying and powdering said product, admixing a fixing agent and a plasticizer, and molding under heat and pressure.

3. In the manufacture of synthetic resins, the process which comprises forming an initial condensation product in aqueous solution from an aldehyde and ammonium cyanate the said condensation being effected in the presence of ammonium cyanate as such, drying and powdering said product, admixing a fixing agent, a plasticizer and a filler, and molding under heat and pressure.

4. In new plastic compositions and molded articles, products having a composition comprising the reaction product of formaldehyde and ammonium cyanate, a fixing agent and a plasticizer.

5. In new plastic compositions and molded articles, products having a composition comprising the reaction product of formaldehyde and ammonium cyanate, a fixing agent, a filler and a plasticizer.

6. In the manufacture of synthetic resins, the steps which comprise forming an initial condensation product in aqueous solution from an aldehyde and ammonium cyanate the said condensation being effected in the presence of ammonium cyanate as such, removing the water and admixing as adjuncts, fixing agents, plasticizers and fillers.

7. In the manufacture of synthetic resins, the steps which comprise forming an initial condensation product in aqueous solution from an aldehyde and ammonium cyanate the said condensation being effected in the presence of ammonium cyanate as such, removing the water, grinding and admixing a fixing agent and a plasticizer.

8. In the manufacture of synthetic resins, the steps which comprise forming an initial condensation product in aqueous solution from an aldehyde and ammonium cyanate the said condensation being effected in the presence of ammonium cyanate as such, removing the water and admixing urea, a plastic resin and a filler.

9. In the manufacture of synthetic resins, the step which comprises reacting formaldehyde in aqueous solution with reaction product of two salts, the said salts being capable of reacting to produce ammonium cyanate, said reaction with formaldehyde being effected in the presence of ammonium cyanate as such.

10. In the manufacture of synthetic resins from formaldehyde and ammonium cyanate, the process which comprises carrying out the initial condensation in a solution having a pH near 7 and in the presence of substantial amounts of ammonium cyanate as such and the final molding in the presence of an acid.

11. In the manufacture of synthetic resins from an aldehyde and ammonium cyanate, the process which comprises adding ammonium cyanate in the salt form to an aqueous solution of formaldehyde, maintaining the mixture at reaction temperature until an initial condensation product is obtained and then recovering the said condensation product.

12. The process of claim 11 wherein said aqueous solution has a pH value above 7.

13. In the manufacture of synthetic resins from aldehydes, the process which comprises generating urea, in situ, in an aqueous solution of formaldehyde, and reacting the formaldehyde with said urea.

14. The process of claim 13 in which said urea is generated from ammonium cyanate and the reaction with formaldehyde is substantially simultaneous with said generation.

15. In the manufacture of synthetic resins from aldehyde by processes wherein said aldehyde is reacted with reactive bodies capable of condensing with formaldehyde, the step which comprises reacting, in situ, in an aqueous formaldehyde solution, a soluble cyanate salt of a metal capable of forming insoluble compounds and a soluble ammonium salt of an acid capable of forming insoluble compounds with said metal.

16. The process of claim 15 in which said cyanate salt is barium cyanate and said ammonium salt is ammonium sulphate.

17. In new plastic compositions and molded articles, said compositions and articles comprising a synthetic resin and a filler, said synthetic resin being products having a composition comprising the reactiton product of formaldehyde and ammonium cyanate and said filler is in a finely divided state having been formed, in situ, in said synthetic resin.

ARTHUR M. HOWALD.